US011668581B2

(12) United States Patent
Liu et al.

(10) Patent No.: US 11,668,581 B2
(45) Date of Patent: Jun. 6, 2023

(54) GENERATING POSITIONS OF MAP ITEMS FOR PLACEMENT ON A VIRTUAL MAP

(71) Applicant: Electronic Arts Inc., Redwood City, CA (US)

(72) Inventors: Han Liu, Millbrae, CA (US); Yiwei Zhao, Sunnyvale, CA (US); Jingwen Liang, Mountain View, CA (US); Mohsen Sardari, Burlingame, CA (US); Harold Chaput, Castro Valley, CA (US); Navid Aghdaie, San Jose, CA (US); Kazi Zaman, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 17/902,290

(22) Filed: Sep. 2, 2022

(65) Prior Publication Data

US 2022/0412765 A1 Dec. 29, 2022

Related U.S. Application Data

(63) Continuation of application No. 16/886,634, filed on May 28, 2020, now Pat. No. 11,473,927.

(Continued)

(51) Int. Cl.
*G01C 21/36* (2006.01)
*G06N 3/08* (2023.01)
*G06F 16/29* (2019.01)

(52) U.S. Cl.
CPC ....... *G01C 21/3673* (2013.01); *G01C 21/367* (2013.01); *G01C 21/3682* (2013.01); *G06F 16/29* (2019.01); *G06N 3/08* (2013.01)

(58) Field of Classification Search
CPC .................................................. G01C 21/3673
See application file for complete search history.

(56) References Cited

U.S. PATENT DOCUMENTS

| 11,000,349 B2 * | 5/2021 | Willers | G16H 30/40 |
| 2017/0259814 A1 * | 9/2017 | Fujimura | G06V 20/58 |

(Continued)

FOREIGN PATENT DOCUMENTS

| CN | 108876805 A | * 11/2018 | G06N 3/0454 |
| CN | 108876805 A | 11/2018 | |

(Continued)

OTHER PUBLICATIONS

George Kelly and Hugh McCabe, "Citygen: An interactive system for procedural city generation," in Fifth International Conference on Game Design and Technology, pp. 8-16, 2007.

(Continued)

*Primary Examiner* — Shelley Chen
(74) *Attorney, Agent, or Firm* — Gray Ice Higdon

(57) ABSTRACT

This specification describes a system for generating positions of map items such as buildings, for placement on a virtual map. The system comprises: at least one processor; and a non-transitory computer-readable medium including executable instructions that when executed by the at least one processor cause the at least one processor to perform at least the following operations: receiving an input at a generator neural network trained for generating map item positions; generating, with the generator neural network, a probability of placing a map item for each subregion of a plurality of subregions of the region of the virtual map; and generating position data of map items for placement on the virtual map using the probability for each subregion. The input to the generator neural network comprises: map data comprising one or more channels of position information for at least a region of the virtual map, said one or more (Continued)

channels including at least one channel comprising road position information for the region; and a latent vector encoding a selection of a placement configuration.

20 Claims, 8 Drawing Sheets

Related U.S. Application Data

(60) Provisional application No. 62/970,631, filed on Feb. 5, 2020.

(56) References Cited

U.S. PATENT DOCUMENTS

| | | | |
|---|---|---|---|
| 2020/0226786 A1* | 7/2020 | Fitzgibbon | G06N 20/20 |
| 2020/0334449 A1* | 10/2020 | Chen | G06F 18/254 |
| 2020/0353920 A1* | 11/2020 | Sun | B60W 30/18159 |
| 2020/0404174 A1* | 12/2020 | Taxbøl | G06T 7/20 |
| 2021/0049829 A1* | 2/2021 | Yang | G06V 10/462 |
| 2021/0200237 A1* | 7/2021 | Kesten | G01C 21/30 |
| 2021/0357630 A1* | 11/2021 | Shaevitz | G06F 18/23213 |
| 2021/0383517 A1* | 12/2021 | Shen | H04N 7/181 |
| 2022/0019840 A1* | 1/2022 | Xie | G06N 3/045 |
| 2022/0405922 A1* | 12/2022 | Krueger | G06V 10/82 |

FOREIGN PATENT DOCUMENTS

| | | | | |
|---|---|---|---|---|
| CN | 110686686 A | * | 1/2020 | |
| CN | 110686686 A | | 1/2020 | |
| CN | 110914888 A | * | 3/2020 | G01C 21/3602 |
| CN | 110914888 A | | 3/2020 | |
| CN | 106912018 B | * | 6/2020 | G01C 21/30 |
| CN | 106912018 B | | 6/2020 | |
| CN | 111340028 A | * | 6/2020 | |
| CN | 111340028 A | | 6/2020 | |
| CN | 111860074 A | * | 10/2020 | |
| CN | 111860074 A | | 10/2020 | |
| CN | 106997466 B | * | 5/2021 | G06K 9/00651 |
| CN | 106997466 B | | 5/2021 | |
| EP | 2615596 A1 | * | 7/2013 | G06K 9/00362 |
| EP | 2615596 A1 | | 7/2013 | |
| JP | 2017159884 A | * | 9/2017 | B60W 30/09 |
| JP | 2017159884 A | | 9/2017 | |
| WO | 2020108647 A1 | | 6/2020 | |
| WO | WO-2020108647 A1 | * | 6/2020 | G01S 13/867 |

OTHER PUBLICATIONS

George Kelly and Hugh McCabe, "A survey of procedural techniques for city generation," The ITB Journal, vol. 7, No. 2, pp. 5, 2006.
Ruben M Smelik, Tim Tutenel, Rafael Bidarra, and Bedrich Benes, "A survey on procedural modelling for virtual worlds," in Computer Graphics Forum. Wiley Online Library, vol. 33, pp. 31-50, 2014.
Tianyu Li, Mary Comer, and Josiane Zerubia, "Feature extraction and tracking of cnn segmentations for improved road detection from satellite imagery," in 2019 IEEE International Conference on Image Processing (ICIP). IEEE, pp. 2641-2645, Jun. 15, 2019.
Carlotta Raby and Fergal Jones, "Identifying risks for male street gang affiliation: A systematic review and narrative synthesis," The Journal of Forensic Psychiatry & Psychology, vol. 27, No. 5, pp. 601-644, 2016.
Carlos A Vanegas, Tom Kelly, Basil Weber, Jan Halatsch, Daniel G Aliaga, and Pascal Müller, "Procedural generation of parcels in urban modeling," in Computer graphics forum.Wiley Online Library, vol. 31, pp. 681-690, 2012.
Niloy J Mitra, Michael Wand, Hao Zhang, Daniel Cohen-Or, Vladimir Kim, and Qi-Xing Huang, "Structure-aware shape processing," in ACM SIG-GRAPH 2014 Courses, pp. 1-21, 2014.
Yong-Liang Yang, Jun Wang, Etienne Vouga, and Peter Wonka, "Urban pattern: Layout design by hierarchical domain splitting," ACM Transactions on Graphics (TOG), vol. 32, No. 6, pp. 1-12, 2013.
Ian Goodfellow, Jean Pouget-Abadie, Mehdi Mirza, Bing Xu, David Warde-Fariey, Sherjil Ozair, Aaron Courville, and Yoshua Bengio, "Generative adversarial nets," in Advances in neural information processing systems, pp. 2672-2680 2014.
Mehdi Mirza and Simon Osindero, "Conditional generative adversarial nets," arXiv preprint arXiv:1411.1784, 2014.
Piotr Bojanowski, Armand Joulin, David Lopez-Pas, and Arthur Szlam, "Optimizing the latent space of generative networks," in International Conference on Machine Learning, pp. 599-608, 2018.
Chuan Li and Michael Wand, "Precomputed real-time texture synthesis with markovian generative adversarial networks," in European conference on computer vision. Springer, pp. 702-716, 2016.
M Ersin Yumer and Niloy J Mitra, "Learning semantic deformation flows with 3d convolutional networks," in European Conference on Computer Vision. Springer, pp. 294-311. 2016.
Stefan Hartmann, Michael Weinmann, Raoul Wessel, and Reinhard Klein, "Streetgan: Towards road network synthesis with generative adversarial networks," 2017.
Wei Ren Tan, Chee Seng Chan, Hern'an E Aguirre, and Kiyoshi Tanaka, "Artgan: Artwork synthesis with conditional categorical gans," in 2017 IEEE International Conference on Image Processing (ICIP). IEEE, pp. 3760-3764, 2017.
Olaf Ronneberger, Philipp Fischer, and Thomas Brox, "U-net: Convolutional networks for biomedical image segmentation," in International Conference on Medical image computing and computer-assisted interven- tion. Springer, pp. 234-241, 2015.
Herv'e Bourlard and Yves Kamp, "Auto-association by multilayer perceptrons and singular value decomposition," Biological cybernetics, vol. 59, No. 4-5, pp. 291-294, 1988.
Takeru Miyato, Toshiki Kataoka, Masanori Koyama, and Yuichi Yoshida, "Spectral normalization for generative adversarial networks," arXiv preprint arXiv:1802.05957, 2018.
Haibin Ling and Kazunori Okada, "Diffusion distance for histogram comparison," in 2006 IEEE Computer Society Conference on Computer Vision and Pattern Recognition (CVPR'06). IEEE, vol. 1, pp. 246-253, 2006.
Ashish Bora, Ajil Jalal, Eric Price, and Alexandros GDimakis, "Compressed sensing using generative models," in Proceedings of the 34th International Conference on Machine Learning—vol. 70. JMLR. org, pp. 537-546, 2017.

* cited by examiner

GENERATING POSITIONS OF MAP ITEMS FOR PLACEMENT ON A VIRTUAL MAP

BACKGROUND

Modelling a virtual city is an important task for many applications such as urban planning and video games. Procedural techniques are widely used to create urban space through multiple steps including generating road networks, placing buildings and other objects, and creating geometries for single objects. However, these existing methods of modelling virtual cities often require time-consuming manual tuning of many hyperparameters.

SUMMARY

In accordance with a first aspect, this specification describes a system for generating positions of map items for placement on a virtual map. The system comprises: at least one processor; and a non-transitory computer-readable medium including executable instructions that when executed by the at least one processor cause the at least one processor to perform at least the following operations: receiving an input at a generator neural network trained for generating map item positions; generating, with the generator neural network, a probability of placing a map item for each subregion of a plurality of subregions of the region of the virtual map; and generating position data of map items for placement on the virtual map using the probability for each subregion. The input to the generator neural network comprises: map data comprising one or more channels of position information for at least a region of the virtual map, said one or more channels including at least one channel comprising road position information for the region; and a latent vector encoding a selection of a placement configuration.

In accordance with a second aspect, this specification describes a computer implemented method of training a generator neural network for use in generating positions of map items for placement on a virtual map. The method comprises receiving one or more training examples. Each training example comprises: (i) map data, comprising one or more channels of position information for a region, (ii) a latent vector, and (iii) at least one ground truth placement of map items. The method further comprises, for each training example of the one or more training examples: generating, with the generator neural network, a generated placement of map items for the training example, comprising processing the map data and the latent vector of the training example. A discriminator neural network determines an estimated probability of the generated placement of map items being a generated placement of map items or a ground truth placement of map items, comprising processing: (i) the generated placement of map items (ii) the map data of the training example, and (iii) the latent vector of the training example. Parameters of the generator neural network are updated, comprising: determining an adversarial loss using the estimated probability; and updating the parameters of the generator neural network in dependence on the adversarial loss.

In accordance with a third aspect, this specification describes a computer-readable medium storing instructions, which when executed by a processor, cause the processor to: receive an input at a generator neural network trained for generating positions of map items for placement on a virtual map; generate, with the generator neural network, a probability of placing a map item for each subregion of a plurality of subregions of the region of the virtual map; and generate placement data of map items for the map data using the probability for each subregion. The input to the generator neural network comprises: map data comprising one or more channels of position information for at least a region of the map, said one or more channels including a channel comprising road position information for the region; and a latent vector encoding a selection of a placement configuration.

BRIEF DESCRIPTION OF THE DRAWINGS

Certain embodiments of the present invention will now be described, by way of example, with reference to the following figures.

DETAILED DESCRIPTION

Example implementations provide system(s) and methods for generating the positions of map items, such as buildings or other structures, for placement on a virtual map. The described systems and methods are particularly advantageous in the context of video game development. Video games are often set in virtual worlds including multiple cities and towns, and different types of neighbourhoods inside these cities and towns. For example, residential areas may be densely populated with low rise buildings, whereas commercial areas may be more sparsely populated but with taller buildings.

When creating virtual worlds, video game artists often use existing maps of the real world to generate realistic virtual cities. These existing maps may comprise location information for different features such as roads, waterways, and vegetation, however information as to buildings or other items on the map may often be missing. As a result, it is desirable to provide a system where video game artists can easily populate incomplete maps, while being able to easily control the configuration of map items generated on the map.

Systems and methods described in the specification allow a user to easily control the configuration of map items generated on the map while generating map items in a realistic manner taking into account the various features on the map. The systems and methods described in the specification allow users to quickly iterate through different designs of virtual cities in real time and obviate the need to manually tune the many parameters required by conventional techniques.

This specification also describes methods for training a generator neural network for use in generating the positions of map items for placement on a virtual map. The methods described in this specification enable the training of latent vectors of various neighbourhood styles, which decouple the style from other conditions (e.g. road information) present in the examples used to train the generator neural network. As a result, after the generator neural network has been trained, the learned latent vectors may be used to easily control the style with which buildings or other map items are generated on new maps in an accurate and realistic manner.

As used herein, the term "map item" refers to any item which may be placed on a virtual map, such a building or other structure, or a park. In some examples, each map item may comprise a building, with different buildings having the same or different heights (e.g. the same or different numbers of floors). Buildings may include residential buildings (e.g. houses), commercial buildings (e.g. restaurants, offices, etc.) or industrial buildings (e.g. power stations). In some examples, described later in this specification, map items may alternatively or additionally include other structures such as parking lots, bridges (e.g. walking bridges) or other architecture blocks.

Figure 1:
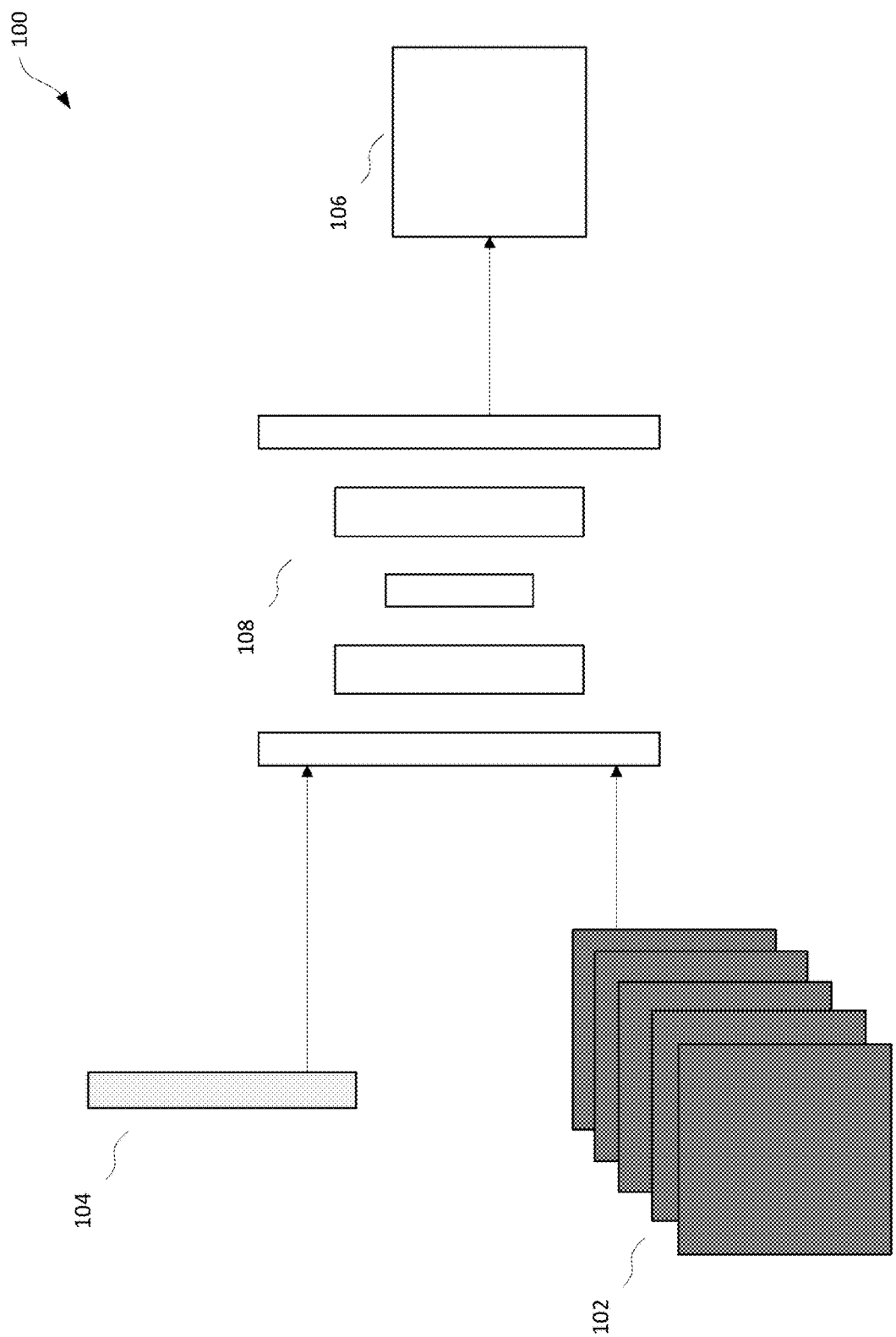
FIG. 1 shows an example method for generating building placements for a virtual map.

FIG. 1 shows an example method 100 for generating building placements for a virtual map. The method 100 takes map data 102 and a latent vector 104 as input and outputs building placement data for the map data 102 from output 106 of a generator neural network 108.

The map data 102 comprises one or more channels of position information for a region. Each channel may represent position information for different features, including at least one channel comprising road position information for the region. The one or more channels may further comprise at least one of: a channel of waterway position information; a channel of vegetation position information; and a channel of existing building position information. The at least one channel comprising road position information for the region may further comprise a channel of highway road position information; a channel of arterial road position information; and a channel of local road position information.

Figure 2:
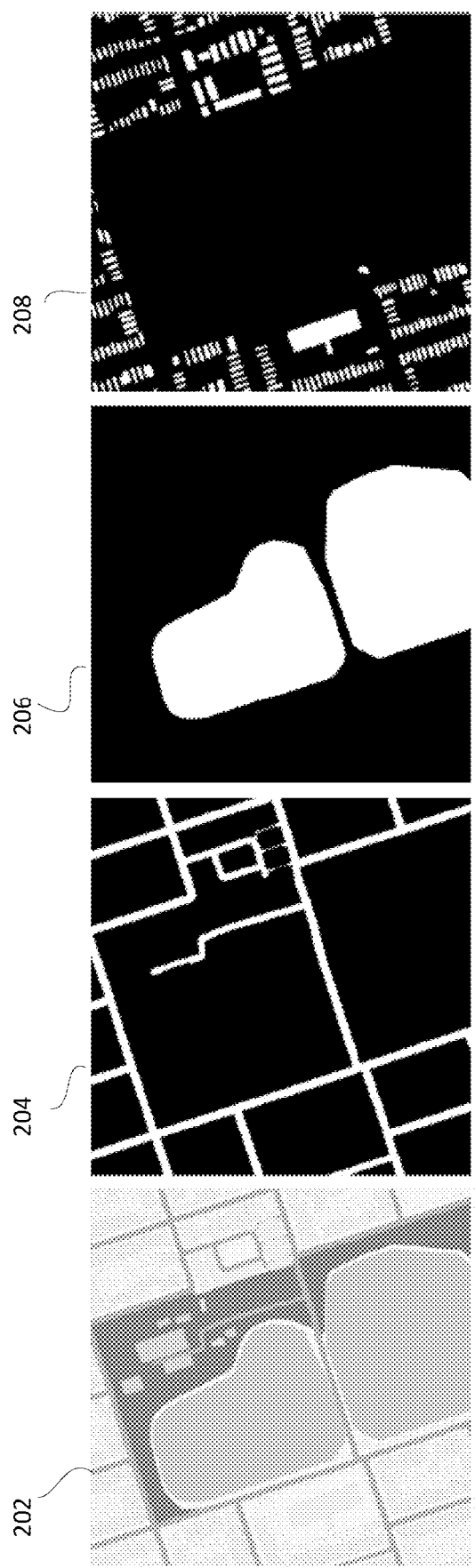
FIG. 2 shows an example of map data.

The map data 102 may be denoted by $C \in \mathbb{R}^{H \times W \times N}$, with H denoting the height of the map data 102, W denoting the width of the map data 102, and N denoting the number of channels of the map data 102. Each element of a channel of position information represents the absence or presence of the corresponding feature for a subregion of the region. Features may be indicated in the map data by binary values with $C \in \{0,1\}^{H \times W \times N}$. For example, $C_{h,w,n}$ being equal to 1 may indicate the presence of the nth feature in a subregion defined by values h, w. An example of map data 102 is shown in FIG. 2.

The map data 102 may be determined based on a user input. For example, a user may input a 2D or 3D representation of the region. The representation of the region may be any digital data representing the region, for example digital data output by software used to produce a rendering of the region. Additionally or alternatively, a user may select a region and the map data may be determined based on the user selection.

The latent vector 104 is a vector of dimension D with parameters $z \in \mathbb{R}^D$ that encodes a building configuration selection. The latent vector 104 may control the style of the buildings generated on the map. For example, varying the latent vector may vary the number of generated buildings, the average size of the generated buildings, and the density with respect to the surrounding environment.

The latent vector 104 may be determined based on a user input. For example, a user may select a reference map and the latent vector 104 may be determined based on the reference map. The reference map may be map data used to train the generator neural network 108 and the latent vector 104 may be a vector that is learned during training of the generator neural network 108. Additionally or alternatively, the latent vector 104 may be sampled from a latent space learned during training of the generator neural network 108 as described in more detail below.

The generator neural network 108 is a neural network trained to generate building placements for a virtual map. The generator neural network 108 comprises a plurality of layers of nodes, each node associated with one or more parameters. The parameters of each node of the neural network may comprise one or more weights and/or biases. The nodes take as input one or more outputs of nodes in a previous layer. The one or more outputs of nodes in the previous layer are used by the node to generate an activation value using an activation function and the parameters of the neural network. One or more of the layers of the generator neural network 108 may be convolutional layers.

The generator neural network 108 receives the map data 102 and the latent vector 104 as input, and outputs a building placement probability for each subregion of a plurality of subregions of the region of the virtual map. For example, the virtual map may comprise a plurality of pixels, and each subregion may comprise one or more pixels of the map. The output 106 of the generator neural network 108 may be denoted by $X' \in \mathbb{R}^{H \times W}$ with $X_{h,w}'$ denoting the building placement probability for a subregion defined by values h, w. Additionally or alternatively, the generator neural network 108 may output a building height for each subregion of a plurality of subregions of the region. In these embodiments, the output 106 of the generator neural network 108 may be denoted by $X' \in \mathbb{R}^{H \times W \times 2}$ with the building placement probabilities and building heights output in separate channels, or may be denoted by $X' \in \mathbb{R}^{H \times W}$ with the building placement probabilities and building heights output into a combined channel.

The generator neural network 108 may be trained using adversarial training with one or more discriminator neural networks. By being trained in an adversarial manner, the generator neural network 108 may generate more realistic building placements than other methods. Examples of training methods are described below in relation to FIG. 5.

The building placement data is data representing generated buildings conditioned on the input map data 102, generated in accordance with a building configuration selection controlled by latent vector 104. Building placement data for the map data 102 is generated using the building placement probability for each subregion. The building placement data indicates the presence or absence of generated buildings for each subregion of the region. The building placement data may be generated by processing the building placement probability for each subregion. For example a threshold may be set such that building placement probabilities greater than the threshold indicate the presence of a building in the corresponding subregion. Hence, the building placement data may be used to place buildings on the virtual map, e.g. by associating the building placement data with the subregions of the virtual map. Additionally, the building placement data may indicate the heights of generated buildings.

In some implementations, the generator neural network 108 may further output a probability distribution over building types for each subregion of a plurality of subregions of the region. For example, the generator neural network 108 may output a probability of placing each of a hospital, a bank, a police station or any other building for each subregion. These probabilities may be used to generate type information for each building that is placed on the map, for example by selecting the building type with the highest generated probability.

In some embodiments, the generator neural network 108 may be trained to additionally or alternatively generate placements for map items other than buildings, for example parking lots, bridges (e.g. walking bridges), tunnels, canals or parks. The generator neural network may output a probability distribution over map item types. The output 106 of the generator neural network 108 may be denoted by $X' \in \mathbb{R}^{H \times W \times K}$, where the generator neural network outputs probabilities of K different map item types being placed for each subregion. The generated probabilities may be used to generate type information for each map item that is placed on the map, for example by selecting the building type with the highest probability for each subregion. A map item type included in the K different map item types may include a map item type corresponding to the absence of a map item.

FIG. 2 shows an example of map data 202. The map data 202 comprises one or more channels 204, 206, 208 of position information for a region. The map data 202 may be denoted by $C \in \mathbb{R}^{H \times W \times N}$ with H denoting the height of the map data 102, W denoting the width of the map data 102, and N denoting the number of channels of the map data 202.

In the example shown in FIG. 2, the map data 202 comprises a channel of road position information 204, a channel of waterway position information 206; and a channel of building position information 208. Each element of a channel of position information represents the absence or presence of the corresponding feature for a subregion of the region. Features are indicated in the map data by binary values with $C \in \{0, 1\}^{H \times W \times N}$. For example, $C_{h,w,n}$ being equal to 1 indicates the presence of the nth feature in a subregion defined by values h, w. For illustrative purposes, the channels 204, 206, 208 of the map data 202 are displayed in image form, with white pixels representing a value of 1, and black pixels representing a value of 0.

The map data 202 may be data used when training a generator neural network to generate building placements for virtual maps, and/or may be data input into the generator neural network after being trained.

When training the generator neural network, the channel of building position information 208 may be ground truth building position information.

After training of the generator neural network, the channel of building position information 208 may represent existing building position information. In some cases, the channel of building position information 208 may be omitted from the map data 202.

Figure 3A:
FIGS. 3A and 3B show examples of generated buildings on virtual maps.
Figure 3B:
Figure 3B:
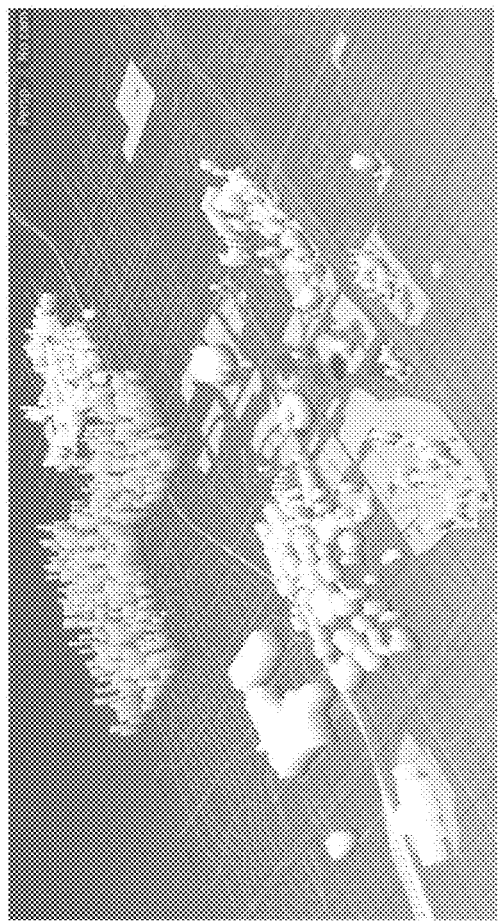

FIGS. 3A and 3B show examples of generated buildings on virtual maps. Virtual maps 302 and 306 are maps determined based on a user input. For example, a user may input a 2D or 3D representation of the region. The representation of the region may be any digital data representing the region, for example digital data output by software used to produce a rendering of the region. Additionally or alternatively, a user may select a region and the map data may be determined based on the user selection.

As described above in relation to FIG. 1, building placement data is generated based on output of a generator neural network. When generating buildings for virtual maps 302 and 306, the map data processed by the generator neural network may correspond to the respective virtual maps 302 and 306. Alternatively, the generator neural network may process different maps, with the generated building placement data being transferred to virtual maps 302 and 306.

Virtual maps 304 and 308 show the generated buildings after respectively applying generated building placement data to virtual maps 302 and 306. In the embodiment shown in FIG. 3B, building height data is also generated from output of the generator neural network, with the heights of generated buildings corresponding to the building height data.

Figure 4:
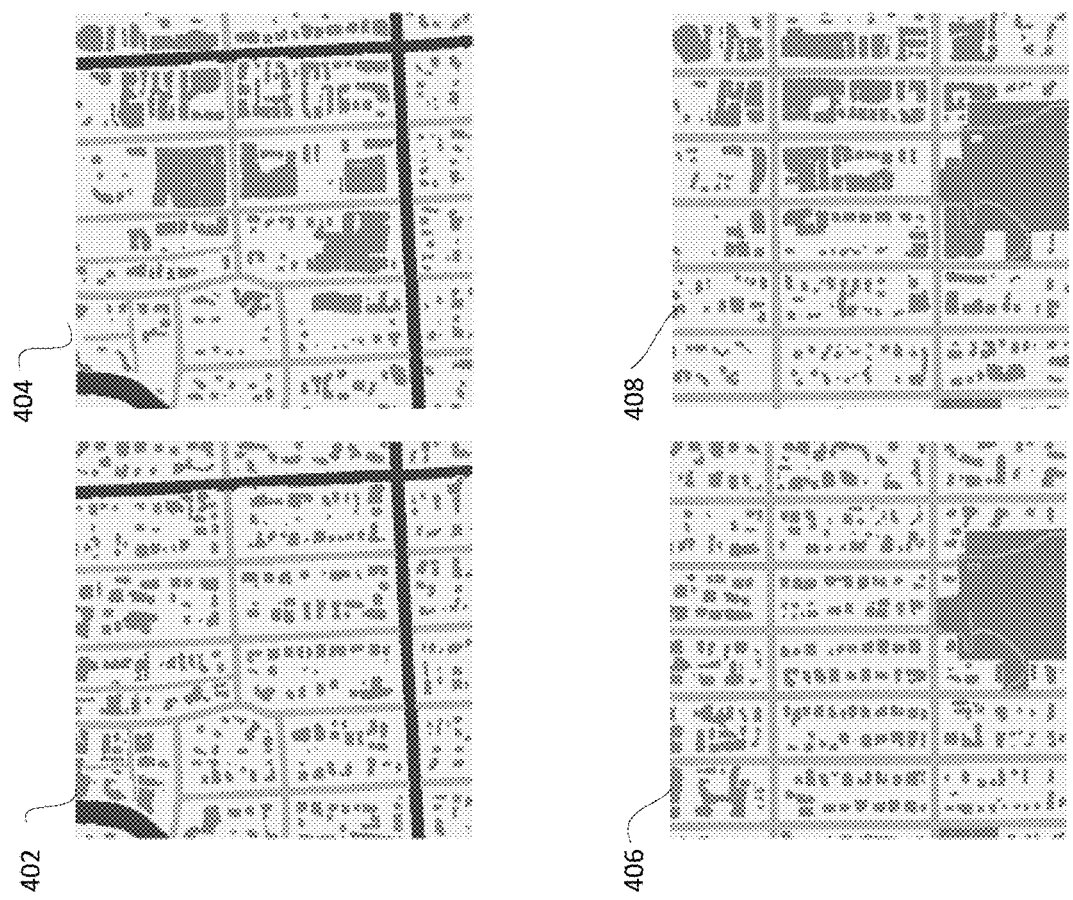
FIG. 4 shows examples of controlling building configurations of generated buildings.

FIG. 4 shows examples of controlling building configurations of generated building placements. As described above in relation to FIG. 1, when using the generator neural network to generate buildings, a latent vector may control the style of the buildings generated on the map. For example, varying the latent vector may vary the number of generated buildings, the average size of the generated buildings, and the density with respect to the surrounding environment.

For example, a first latent vector is processed by the generator neural network when generating the buildings shown in virtual maps 402 and 406. The style of the generated buildings shown in maps 402 and 406 correspond to a residential style, with a large number of smaller buildings being generated. A second latent vector is processed by the generator neural network when generating the buildings shown in virtual maps 404 and 408. The style of the generated buildings shown in maps 404 and 408 correspond to a commercial style, with a small number of larger buildings being generated.

Figure 5:
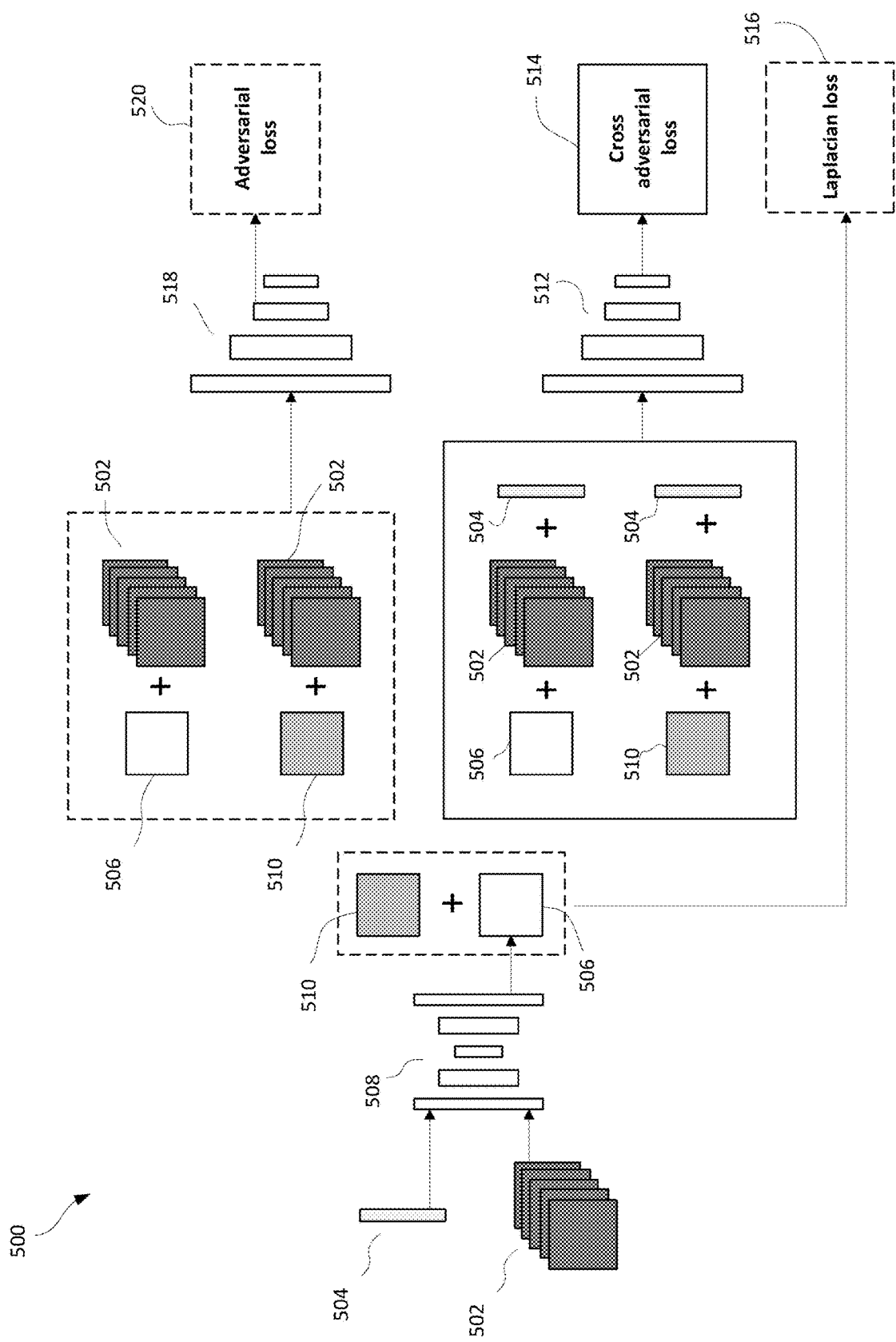
FIG. 5 shows an example system of training a generator neural network for use in generating building placements for a virtual map.

FIG. 5 shows an example system 500 of training a generator neural network 508, such as the one shown in FIG. 1, for use in generating building placements for a virtual map.

The system 500 is configured to train the generator neural network 508 using one or more training examples and an objective function. The objective function comprises a cross adversarial loss 514 determined using a cross discriminator neural network 512. The objective function may further comprise a further adversarial loss 520 determined using a further discriminator neural network 518. Additionally or alternatively, the objective function may further comprise a reconstruction loss 516 depending on a comparison between generated building placements 506 and ground truth building placements 510. The objective function may comprise any combination of the cross adversarial loss 514 with the further adversarial loss 520 and the reconstruction loss 520, and may be, for example, a weighted combination of the three losses.

The objective for the generator neural network 508 is to produce realistic generated building placements 506 for map data 502 similar to the ground truth building placement 510 for the map data 502, while generalising well to unseen examples of map data 502.

When training the generator neural network, latent vectors 504 may also be learned. Latent vectors 504 are learned so as to accurately encode the building configuration of ground truth building placements, while decoupling building configuration from other input information (such as road position information). In this way, learned latent vectors 504 may be used, after the generator neural network 504 has been trained, to accurately transfer building configuration information of a reference map to a new map.

The objective for the one or more discriminator neural networks 512, 518 is to accurately distinguish between generated building placements 506 and ground truth building placements 510 for the map data 502. In addition to the map data 502, a cross discriminator neural network 512 may receive a latent vector 504 as an additional input to determine whether the building configuration of a building placement input to the cross discriminator neural network 512 (being either a generated or a ground truth building placement) corresponds to the latent vector 504.

In other words, the generator neural network 508 is trained to produce realistic generated building placements 506 such that the one or more discriminator neural network 512, 518 cannot easily distinguish between generated building placements 506 and ground truth building placements 510. In addition, the generator neural network 508 is trained to produce generated building placements 506 in a building configuration according to latent vector 504 and map data 502.

The training process comprises multiple training iterations of generator updates and discriminator updates. Training iterations of generator updates comprise performing updates to parameters of the generator neural network 508, and optionally, performing updates to one or more latent vectors 504. Training iterations of discriminator updates comprise in performing updates to parameters of the cross discriminator neural network 512, and optionally, performing updates to parameters of the further discriminator neural network 518.

Parameters and/or latent vectors are updated by optimizing the objective function using any suitable optimization procedure. For example, the objective function may be optimized using gradient-based methods such as stochastic gradient descent/ascent. In particular, the objective function may be minimized using gradient-based methods such as stochastic gradient descent.

The generator neural network 508 is trained by processing one or more training examples. A training example comprises: (i) map data 502, comprising one or more channels of position information for a region, (ii) a latent vector 504, and (iii) one or more channels of ground truth building placements 510. The ground truth building placement 510 indicates the presence or absence of buildings for each subregion of the map. Additionally, the ground truth building placement 510 may indicate the heights of buildings.

In some examples, the generator neural network 508 may additionally or alternatively be trained using training examples which specify placement data for other map items, such as parking lots, bridges (e.g. walking bridges), tunnels, canals or parks. In this way, the generator neural network may be trained to predict the presence or absence of map items in each sub-region of the map.

In some examples, the generator neural network may be trained using ground truth data indicating map item types for each subregion of the map. For example, a map item types may include a hospital, a bank, a police station, any other structure for each subregion. In some examples, the map item types may indicate other structures such as parking lots, bridges (e.g. walking bridges), tunnels, canals or parks. A map item type included in a set of different map item types may include a map item type corresponding to the absence of a map item. Map item types may be represented by categorical variables which may, for example, be represented as integers. For example, zero may correspond to a residential building, 1 may correspond to a shopping mall, 2 may correspond to a police station, etc.

Prior to training the generator neural network 508, an initial latent vector $z^{(i)}$ may be assigned to each of a pair of map data $C^{(i)}$, and ground truth building placements $X^{(i)}$, resulting in N training examples of the form $(C^{(i)}, X^{(i)}, z^{(i)})$, i=1, . . . , N. The latent vector 504 is learned during training of the generator neural network 508. As latent vector $z^{(i)}$ is associated with the $i^{th}$ training example, learning latent vector $z_i$ results in learning an encoding of the building configuration of ground truth building placement $X^{(i)}$.

For illustrative purposes, the following steps will be described in relation to processing one training example however it will be appreciated that any number of training examples may be used to update parameters of the generator neural network 508. Moreover, for illustrative purposes, the following steps will be described in relation to training the generator neural network 508 for building placement. However, it will be understood that the generator neural network 508 may alternatively or additionally be trained for placing map items other than buildings using the techniques described herein.

The map data 502, $C^{(i)}$, and the latent vector 504, $z^{(i)}$, of the training example is processed by the generator neural network 508 to generate a generated building placement 506, $X'^{(i)}$, for the training example. The generated building placement 506 comprises a building placement probability for each subregion of a plurality of subregions of the region of the map. Additionally, the generated building placement 506 may comprise a building height for each subregion of a plurality of subregions of the region. Additionally or alternatively, the generator neural network may generate data indicating building types for each subregion of the map. For example, the building types may include a hospital, a bank, a police station, or any other building type for each subregion. A building type included in a set of different building types may include a building item type corresponding to the absence of a building. Building types may be represented by categorical variables which may, for example, be represented as integers.

Cross Adversarial Loss

The parameters of the generator neural network 508 are updated in dependence on a cross adversarial loss 514. The cross discriminator neural network 512 determines an estimated probability of the generated building placement 506 being a ground truth building placement 510. The estimated probability is determined from processing the generated building placement 506, the map data 502 of the training example, and the latent vector 504 of the training example with the cross discriminator neural network 512. The cross adversarial loss 514 is determined using the estimated probability.

The cross discriminator neural network 512 comprises a plurality of layers of nodes, each node associated with one or more parameters. The parameters of each node of the neural network may comprise one or more weights and/or biases. The nodes take as input one or more outputs of nodes in a previous layer. The one or more outputs of nodes in the previous layer are used by the node to generate an activation value using an activation function and the parameters of the neural network. One or more of the layers of the cross discriminator neural network 512 may be convolutional layers. Adversarial training methods are used to train the cross discriminator neural network 512 during training of the generator neural network 508.

The latent vector 504 of the training example is also updated in dependence on the cross adversarial loss. By inputting the latent vector 504 into the cross discriminator neural network 512 when determining the cross adversarial loss 514, and subsequently updating the latent vector 504 in dependence on the cross adversarial loss 514, a latent vector 504 that accurately encodes the building configuration of the ground truth building placement 510 can be learned.

One or more of the training examples may be cross training examples. A cross training example is derived from a first training example by replacing the latent vector of the first training example with the latent vector of a second training example. For example, for a first training example $(C^{(1)}, X^{(1)}, z^{(1)})$ and a second training example $(C^{(2)}, X^{(2)}, z^{(2)})$, a cross training example may be given by $(C^{(1)}, X^{(1)}, z^{(2)})$. When the cross training example is processed by the generator neural network 508, the latent vector 504 of the second training example $z^{(2)}$ is updated instead of the latent vector 504 of the first training example $z^{(1)}$. Learning latent vectors 504 in this manner may help to avoid overfitting of the latent vector 504. Overfitting of a latent vector 504 may occur if the latent vector 504 additionally encodes information present in the map data 502 of the corresponding training example, preventing realistic transfer of building configuration to new map data.

When training the cross discriminator neural network 512, parameters of the cross discriminator neural network 512 are also updated in dependence on the cross adversarial loss 514. The cross adversarial loss 514 may further be based on probabilities determined by the cross discriminator neural network 512 from processing a ground truth building placement 510 of a training example, the map data 502 of the training example, and the latent vector 504 of the training example.

The generator neural network 508 may be trained to minimise the cross adversarial loss 514, while the cross discriminator neural network 512 may be trained to maximise the cross adversarial loss 514, or vice versa.

An example of a cross adversarial loss 514, with G denoting the generator neural network 508 and $D_1$ denoting the cross discriminator neural network 512, may be provided as:

$$L_{adv1}(G,D_1,z) = \mathbb{E}_{ground\ truth}[\log D_1(z,C,X)] + \mathbb{E}_{generated}[\log(1-D_1(z,C,X'))]$$

The expectations may be approximated by sampling from the relevant distributions of building placements (e.g. ground truth building placements and generated building placements) and performing the operations inside the expectation operator.

Further Adversarial Loss

The parameters of the generator neural network 508 may additionally be updated in dependence on a further adversarial loss 520 determined from output of a further discriminator neural network 518.

The further discriminator neural network 518 comprises a plurality of layers of nodes, each node associated with one or more parameters. The parameters of each node of the neural network may comprise one or more weights and/or biases. The nodes take as input one or more outputs of nodes in a previous layer. The one or more outputs of nodes in the previous layer are used by the node to generate an activation value using an activation function and the parameters of the neural network. One or more of the layers of the cross discriminator neural network 512 may be convolutional layers. Adversarial training methods are used to train the further discriminator neural network 518 during training of the generator neural network 508.

In these implementations, the further discriminator neural network 518 determines an estimated probability of the generated building placement 506 being a ground truth building placement 510. This estimated probability is determined from processing the generated building placement 506 and the map data 502 of the training example with the further discriminator neural network 518. The further adversarial loss 520 is determined using the estimated probability determined by the further discriminator neural network 518.

When training the further discriminator neural network 518, parameters of the further discriminator neural network 518 are also updated in dependence on the further adversarial loss 520. The further adversarial loss 520 may further be based on probabilities determined by the further discriminator neural network 518 from processing a ground truth building placement 510 of a training example and the map data 502 of the training example.

The generator neural network 508 may be trained to minimise the further adversarial loss 520, while the further discriminator neural network 518 may be trained to maximise the further adversarial loss 520, or vice versa.

An example of a further adversarial loss 520, with G denoting the generator neural network 508 and $D_2$ denoting the further discriminator neural network 518, may be provided as:

$$L_{adv2}(G,D_2) = \mathbb{E}_{ground\ truth}[\log D_2(C,X)] + \mathbb{E}_{generated}[\log(1-D_2(C,X'))]$$

The expectations may be approximated by sampling from the relevant distributions of building placements (e.g. ground truth building placements and generated building placements) and performing the operations inside the expectation operator.

Reconstruction Loss

In some implementations, the parameters of the generator neural network 508 may additionally be updated in dependence on a reconstruction loss 516. The reconstruction loss 516 may be determined depending on a comparison between the generated building placement 506 and the ground truth building placement 510. For example, the reconstruction loss may be determined using a Laplacian pyramid loss, an $L_1$ reconstruction loss, an $L_2$ reconstruction loss (or least squares loss/squared loss), or any combination of the above. The latent vector 504 of the training example may also be updated in dependence on the reconstruction loss 516.

An example of a reconstruction loss 516, with $L_j(X)$ representing the $j^{th}$ level of the Laplacian pyramid representation of X, may be provided as:

$$Lap_1(X, X') = \sum_j 2^{2j} |L_j(X) - L_j(X')|$$

An overall objective function used to train the parameters of the generator neural network 508 (denoted by $\omega$ in the below), and optionally, latent vectors 504, may be provided as:

$$L_{G\omega} = Lap_1(X, G_\omega(C,z)) + \lambda_1 L_{adv1} + \lambda_2 L_{adv2}$$

Hyperparameters $\lambda_1, \lambda_2$ are non-negative values used to weight the contribution of the corresponding term to the objective function. As described above, one or more of the terms $Lap_1(X, G_\omega(C,z))$ and $\lambda_2 L_{adv2}$ may in some examples be omitted from the objective function.

When training the neural networks and learning the latent vectors 504, the following implementation may be desirable. Latent vectors 504 and neural network parameters may be learned by Stochastic Gradient Descent (SGD). The gradient of the loss function with respect to latent vectors 504 and generator neural network parameters can be obtained through backpropagation. The generator neural network 508 may be trained up to 200 epochs with learning rate 0.5 on generator, 0.00001 on discriminator, and 800 on Z. Training may comprise of alternate updates of generator updates and discriminator updates. Generator updates may comprise of five updates to the latent vectors 504 for every update of the parameters of the generator neural network 508. A discriminator update may be performed after every three generator updates.

Figure 6:
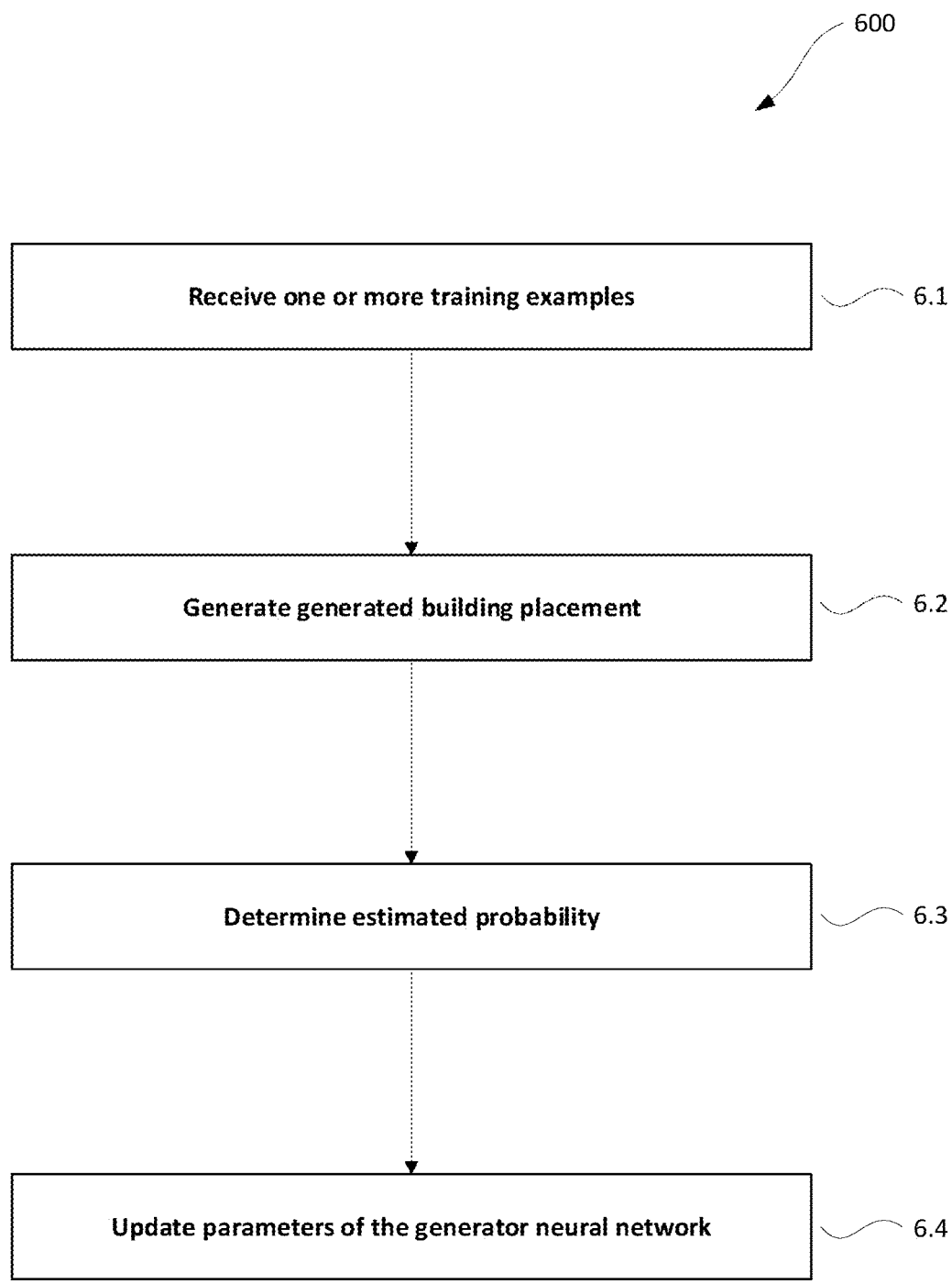
FIG. 6 is a flow diagram of an example method of training a generator neural network for use in generating building placements for a virtual map.

FIG. 6 is a flow diagram of an example method 600 of training a generator neural network for use in generating building placements for a virtual map. The steps of method 600 may be performed by the system of FIG. 5. It should be noted that although FIG. 6 describes training the generator neural network for building placement, in some examples the generator neural network may alternatively or additionally be trained for placement of other map items on the virtual map, for example parking lots, bridges (e.g. walking bridges), parks, tunnels, or canals.

In step 6.1, one or more training examples are received. A training example comprises: (i) map data, comprising one or more channels of position information for a region, (ii) a latent vector, and (iii) one or more channels of ground truth building placements.

The map data comprises one or more channels of position information for a region. Each channel may represent position information for different features, including at least one channel comprising road position information for the region. The one or more channels may further comprise at least one of: a channel of waterway position information; a channel of vegetation position information; and a channel of existing building position information. The at least one channel comprising road position information for the region may further comprise a channel of highway road position information; a channel of arterial road position information; and a channel of local road position information.

The latent vector is a vector of dimension D having parameters $z \in \mathbb{R}^D$ that encodes a building configuration selection. The latent vector 104 may control the style of the buildings generated on the map. For example, varying the latent vector may vary the number of generated buildings, the average size of the generated buildings, and the density with respect to surrounding environment.

The ground truth building placement indicates the presence or absence of buildings for each subregion of the map. Additionally, the ground truth building placement 210 may indicate the heights of buildings.

In step 6.2, generated building placements are generated. A generator neural network 108 receives map data and the latent vector of a training example as input, and outputs a building placement probability for each subregion of a plurality of subregions of the region of the map. Additionally or alternatively, the generator neural network may output a building height for each subregion of a plurality of subregions of the region.

In step 6.3, an estimated probability is determined. The cross discriminator neural network determines the estimated probability of the generated building placement being a generated building placement or a ground truth building placement. The estimated probability is determined from processing the generated building placement 206, the map data of the training example, and the latent vector of the training example with the cross discriminator neural network. The cross adversarial loss is determined using the estimated probability. The parameters of the generator neural network 208 are updated in dependence on a cross adversarial loss.

In some implementations, a further adversarial loss and/or a reconstruction loss may also be determined, as described in relation to FIG. 5.

In step 6.4, parameters of the generator neural network are updated. The generator neural network trained using an objective function. The objective function comprises a cross adversarial loss determined using a cross discriminator neural network. The objective function may further comprise a further adversarial loss determined using a further discriminator neural network. Additionally or alternatively, the objective function may further comprise a reconstruction loss depending on a comparison between generated building placements and ground truth building placements. The objective function may comprise any combination of the cross adversarial loss with the further adversarial loss and the reconstruction loss, and may be, for example, a weighted combination of the three losses. Parameters of the generator neural network are updated by optimizing the objective function using any suitable optimization procedure. For example, the objective function may be optimized using gradient-based methods such as stochastic gradient descent/ascent.

Figure 7:
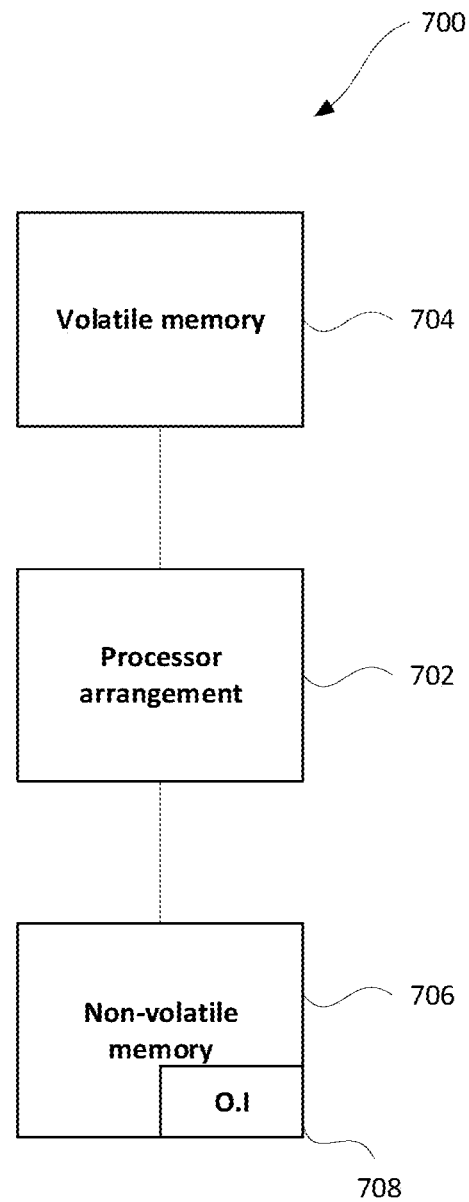
FIG. 7 shows a schematic example of a system/apparatus for performing any of the methods described herein.

FIG. 7 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 700 comprises one or more processors 702. The one or more processors control operation of other components of the system/apparatus 700. The one or more processors 702 may, for example, comprise a general purpose processor. The one or more processors 702 may be a single core device or a multiple core device. The one or more processors 702 may comprise a central processing unit (CPU) or a graphical processing unit (GPU). Alternatively, the one or more processors 702 may comprise specialised processing hardware, for instance a RISC processor or programmable hardware with embedded firmware. Multiple processors may be included.

The system/apparatus comprises a working or volatile memory 704. The one or more processors may access the volatile memory 704 in order to process data and may control the storage of data in memory. The volatile memory 704 may comprise RAM of any type, for example Static RAM (SRAM), Dynamic RAM (DRAM), or it may comprise Flash memory, such as an SD-Card.

The system/apparatus comprises a non-volatile memory 706. The non-volatile memory 706 stores a set of operation instructions 708 for controlling the operation of the processors 702 in the form of computer readable instructions. The non-volatile memory 706 may be a memory of any kind such as a Read Only Memory (ROM), a Flash memory or a magnetic drive memory.

The one or more processors 702 are configured to execute operating instructions 708 to cause the system/apparatus to perform any of the methods described herein. The operating instructions 708 may comprise code (i.e. drivers) relating to the hardware components of the system/apparatus 700, as well as code relating to the basic operation of the system/apparatus 700. Generally speaking, the one or more processors 702 execute one or more instructions of the operating instructions 708, which are stored permanently or semi-permanently in the non-volatile memory 706, using the volatile memory 704 to temporarily store data generated during execution of said operating instructions 708.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 7, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer implemented method of training a generator neural network for use in generating positions of map items for placement on a virtual map, the method comprising:
   receiving one or more training examples, each training example including: (i) map data, including one or more channels of position information for a region, (ii) a latent vector, and (iii) at least one ground truth placement of map items;
   for each training example of the one or more training examples:
      generating, with the generator neural network, a generated placement of map items for the training example, including processing the map data and the latent vector of the training example;
      determining, with a discriminator neural network, an estimated probability of the generated placement of map items being generated by the generator neural network, including processing: (i) the generated placement of map items (ii) the map data of the training example, and (iii) the latent vector of the training example; and
      updating parameters of the generator neural network, including:
         determining an adversarial loss using the estimated probability; and
         updating the parameters of the generator neural network in dependence on the adversarial loss.

2. The method of claim 1, wherein the latent vector of a training example is updated in dependence on the adversarial loss so as to encode a placement configuration of the at least one ground truth placement of map items of the training example.

3. The method of claim 2, wherein:
   the one or more training examples comprise a plurality of training examples; and
   one or more of the training examples are cross training examples, a cross training example being derived from a first training example and a second training example, the method further comprising:
      replacing the latent vector of the first training example with the latent vector of the second training example.

4. The method of claim 3, further comprising:
   for each cross training example, updating the latent vector of the second training example in dependence on the adversarial loss.

5. The method of claim 1, wherein updating the parameters of the generator neural network further comprises:
   determining a reconstruction loss depending on a comparison between the generated placement of map items and the ground truth placement of map items; and
   updating the parameters of the generator neural network in dependence on the reconstruction loss.

6. The method of claim 5, further comprising:
   updating the latent vector of the training example in dependence on the reconstruction loss.

7. The method of claim 6, wherein the reconstruction loss is determined using a Laplacian pyramid.

8. The method of claim 1, further comprising:
   determining, with a further discriminator neural network, a further estimated probability of the generated placement of map items being generated by the generator neural network, including processing: (i) the generated placement of map items, and (ii) the map data of the training example; and
   wherein updating the parameters of the generator neural network further comprises:
      determining a further adversarial loss using the further estimated probability; and
      updating the parameters of the generator neural network in dependence on the further adversarial loss.

9. A system for training a generator neural network for use in generating positions of map items for placement on a virtual map, comprising:
   at least one processor; and
   a non-transitory computer-readable medium including executable instructions that when executed by the at least one processor cause the at least one processor to perform at least the following operations:
      receive one or more training examples, each training example including: (i) map data, including one or more channels of position information for a region, (ii) a latent vector, and (iii) at least one ground truth placement of map items;
      for each training example of the one or more training examples:
         generate, with the generator neural network, a generated placement of map items for the training example, including processing the map data and the latent vector of the training example;
         determine, with a discriminator neural network, an estimated probability of the generated placement of map items generated by the generator neural network, including processing: (i) the generated placement of map items (ii) the map data of the training example, and (iii) the latent vector of the training example; and
         update parameters of the generator neural network, including:
            determining an adversarial loss using the estimated probability; and
            updating the parameters of the generator neural network in dependence on the adversarial loss.

10. The system of claim 9, wherein the latent vector of a training example is updated in dependence on the adversarial loss so as to encode a placement configuration of the at least one ground truth placement of map items of the training example.

11. The system of claim 10, wherein:
   the one or more training examples comprise a plurality of training examples; and
   one or more of the training examples are cross training examples, a cross training example being derived from a first training example and a second training example, the operations further comprising:
replacing the latent vector of the first training example with the latent vector of the second training example.

12. The system of claim 11, wherein the operations further comprise:
for each cross training example, updating the latent vector of the second training example in dependence on the adversarial loss.

13. The system of claim 9, wherein updating the parameters of the generator neural network further comprises:
determining a reconstruction loss depending on a comparison between the generated placement of map items and the ground truth placement of map items; and
updating the parameters of the generator neural network in dependence on the reconstruction loss.

14. The system of claim 13, wherein the operations further comprise:
updating the latent vector of the training example in dependence on the reconstruction loss.

15. The system of claim 14, wherein the reconstruction loss is determined using a Laplacian pyramid.

16. The system of claim 9, wherein the operations further comprise:
determining, with a further discriminator neural network, a further estimated probability of the generated placement of map items generated by the generator neural network, including processing: (i) the generated placement of map items, and (ii) the map data of the training example; and
wherein updating the parameters of the generator neural network further comprises:
determining a further adversarial loss using the further estimated probability; and
updating the parameters of the generator neural network in dependence on the further adversarial loss.

17. A non-transitory computer-readable medium comprising instructions, which when executed by a processor, cause the processor to:
receive one or more training examples, each training example including: (i) map data, including one or more channels of position information for a region, (ii) a latent vector, and (iii) at least one ground truth placement of map items;
for each training example of the one or more training examples:
generate, with a generator neural network, a generated placement of map items for the training example, including processing the map data and the latent vector of the training example;
determine, with a discriminator neural network, an estimated probability of the generated placement of map items being generated by the generator neural network, including processing: (i) the generated placement of map items (ii) the map data of the training example, and (iii) the latent vector of the training example; and
update parameters of the generator neural network, including:
determining an adversarial loss using the estimated probability; and
updating the parameters of the generator neural network in dependence on the adversarial loss.

18. The non-transitory computer-readable medium of claim 17, wherein the latent vector of a training example is updated in dependence on the adversarial loss so as to encode a placement configuration of the at least one ground truth placement of map items of the training example.

19. The non-transitory computer-readable medium of claim 18, wherein:
the one or more training examples comprise a plurality of training examples; and
one or more of the training examples are cross training examples, a cross training example being derived from a first training example and a second training example, the computer-readable medium storing further instructions, which when executed by the processor, cause the processor to:
replace the latent vector of the first training example with the latent vector of the second training example.

20. The non-transitory computer-readable medium of claim 19, storing further instructions, which when executed by the processor, cause the processor to:
for each cross training example, update the latent vector of the second training example in dependence on the adversarial loss.

* * * * *